United States Patent
Hui et al.

(10) Patent No.: US 9,544,018 B2
(45) Date of Patent: Jan. 10, 2017

(54) PHASE DETERMINATION IN SMART GRID NETWORKS

(71) Applicant: Cisco Technology, Inc., San Jose, CA (US)

(72) Inventors: Jonathan W. Hui, Belmont, CA (US); Wei Hong, Berkeley, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 221 days.

(21) Appl. No.: 14/154,127

(22) Filed: Jan. 13, 2014

(65) Prior Publication Data

US 2015/0200713 A1   Jul. 16, 2015

(51) Int. Cl.

| | |
|---|---|
| *H04L 12/28* | (2006.01) |
| *H04W 4/00* | (2009.01) |
| *G01R 21/00* | (2006.01) |
| *G01R 13/00* | (2006.01) |
| *H04B 3/54* | (2006.01) |
| *H04L 29/08* | (2006.01) |

(Continued)

(52) U.S. Cl.
CPC ................. *H04B 3/544* (2013.01); *H02J 3/26* (2013.01); *H02J 13/0013* (2013.01); *H04L 12/2803* (2013.01); *H04L 67/12* (2013.01); *H04L 2012/2843* (2013.01); *Y02E 40/50* (2013.01); *Y02E 60/7807* (2013.01); *Y02E 60/7892* (2013.01); *Y04S 40/12* (2013.01); *Y04S 40/146* (2013.01)

(58) Field of Classification Search
CPC ......... H04B 3/544; H02J 3/26; H02J 13/0013; H04L 12/2803
See application file for complete search history.

(56) References Cited

U.S. PATENT DOCUMENTS

| | | |
|---|---|---|
| 8,533,121 B1 | 9/2013 | Piesinger et al. |
| 8,712,711 B2 | 4/2014 | Nayar |

(Continued)

FOREIGN PATENT DOCUMENTS

WO    2013025836 A1    2/2013

OTHER PUBLICATIONS

Chaumeron, "International Search Report and Written Opinion issued in International Application No. PCT/ US2015/10744", May 6, 2015, 1-11.

*Primary Examiner* — Kiet Tang
(74) *Attorney, Agent, or Firm* — Johnson, Marcou & Isaacs, LLC

(57) ABSTRACT

In a multiple interface, low power and lossy network comprising multiple nodes, a root phase device obtains phase differential and absolute phase information from the devices in various network paths. Each device in a network path determines the differential phase data compared to its parent device in a network path. The device transmits the differential phase data to the parent device. The parent device transmits the differential phase data up the network path toward the root phase device. The root phase device collects the differential phase data and transmits the data to a central device. The central device determines the absolute phase of all devices. The root phase device can propagate absolute phase information to all devices within the network. Each device determines the absolute phase data by comparing the phase data of the device with the absolute phase data. The phase data is transmitted to a central device.

15 Claims, 9 Drawing Sheets

(51) Int. Cl.
*H02J 3/26* (2006.01)
*H02J 13/00* (2006.01)

(56) References Cited

U.S. PATENT DOCUMENTS

| | | |
|---|---|---|
| 2010/0060259 A1 | 3/2010 | Vaswani et al. |
| 2011/0161022 A1 | 6/2011 | Caird et al. |
| 2011/0176416 A1* | 7/2011 | Bhatti ................... H04N 7/18 370/230 |
| 2013/0024149 A1 | 1/2013 | Nayar et al. |
| 2013/0241746 A1 | 9/2013 | McKinley et al. |

* cited by examiner

PHASE DETERMINATION IN SMART GRID NETWORKS

TECHNICAL FIELD

The present disclosure relates generally to computer networks and, more particularly, to determining absolute phase data for devices in a network.

BACKGROUND

Constrained networks include, for example, Low power and Lossy Networks (LLNs), such as sensor networks. These constrained networks have a myriad of applications, such as Smart Grid, Smart Cities, home and building automation, etc. Various challenges are presented with LLNs, such as lossy links, low bandwidth, battery operation, low memory and/or processing capability, etc. Large-scale internet protocol (IP) smart object networks pose a number of technical challenges. For instance, the degree of density of such networks (such as Smart Grid networks with a large number of sensors and actuators, smart cities, or advanced metering infrastructure (AMI) networks) may be extremely high. For example, it is not rare for each node to see several hundreds of neighbors. This architecture is particularly problematic for LLNs, where constrained links can wreak havoc on data transmission.

Network developers would like to have the endpoints of the network know the electrical phase to which the devices are connected. One important benefit of knowing the phase information is that this knowledge allows utility companies and other system managers to make better decisions about load balancing on the distribution network. While physical field inspection may provide the system manager with some information about the phase to which each endpoint is connected, the information is often inaccurate or insufficient. Current technologies do not provide the ability to determine the phase of each of the network devices.

DESCRIPTION OF EXAMPLE EMBODIMENTS

Overview

Figure 1:
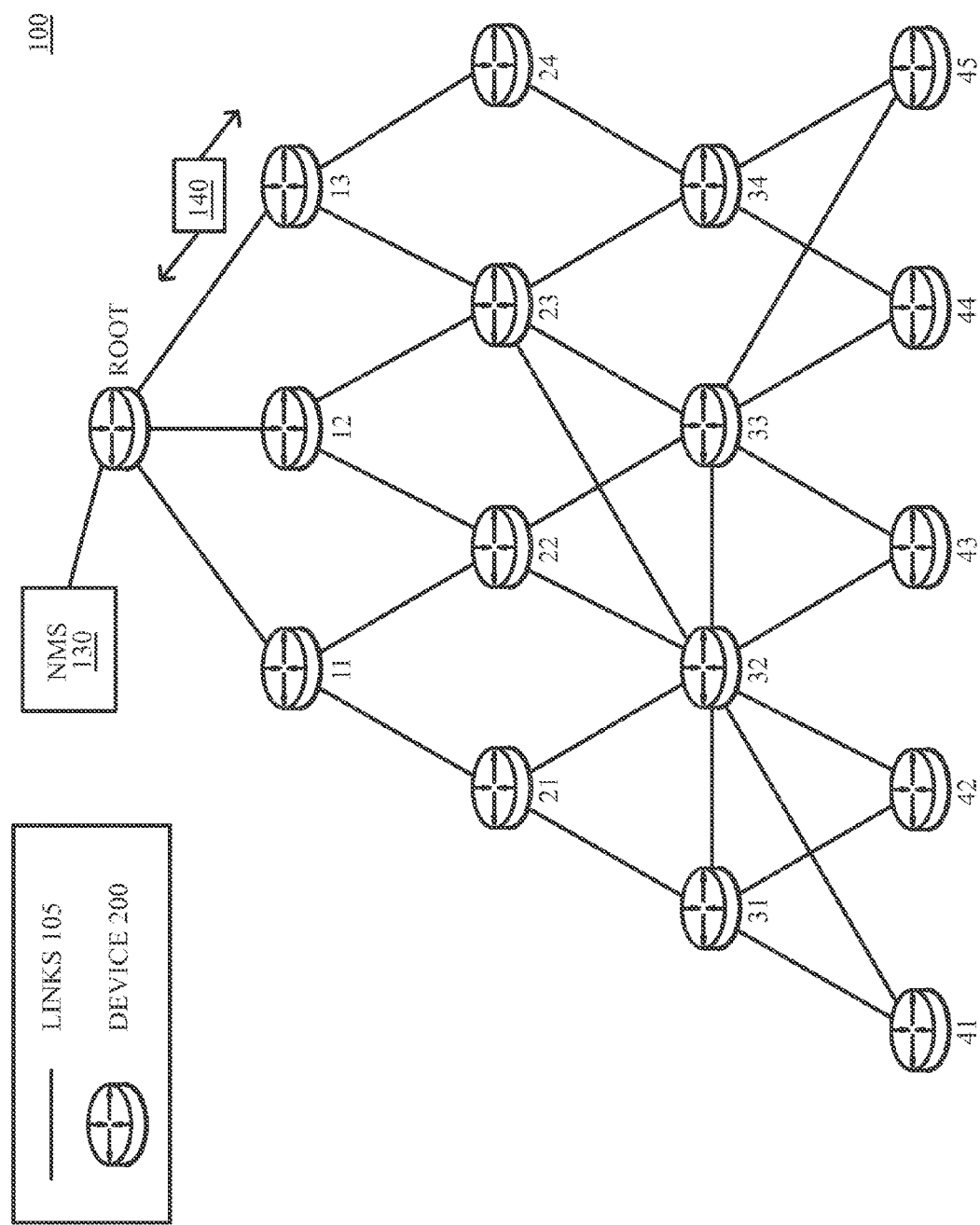
FIG. 1 is a diagram depicting an example communication network, in accordance with certain example embodiments.

In a multiple interface, low power and lossy network comprising a plurality of devices, " " a root phase device obtains phase differential and absolute phase information from the devices in the network paths. In an example embodiment, each device in a network path determines the differential phase data compared to the parent device in a network path. Each device transmits the differential phase data to the parent device. The parent device transmits the differential phase data up the network path toward the root phase device. The root phase device collects the differential phase data and transmits the data to a central device, such as a field area router ("FAR") or network management system ("NMS"). The central device performs a graph propagation search to determine absolute phase of all devices.

In an alternative embodiment, the root phase device, or other device with absolute phase data, propagates absolute phase information to all devices within the network. Each of the devices determines the absolute phase data of the device by comparing the phase data of the device with the absolute phase data. The phase data is transmitted to a central device. The central device may collect the phase data for all the devices in the network.

Description

Referring to the drawings, in which like numerals represent like (but not necessarily identical) elements throughout the figures, example embodiments are described.

The operations described with respect to any of the FIGS. 1-9 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

A computer network is a geographically distributed collection of nodes interconnected by communication links and segments for transporting data between end nodes. Nodes and end nodes include, for example, personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network that is generally considered a self-configuring network of mobile routes (and associated hosts) connected by wireless links, the union of which forms an arbitrary topology.

Smart object networks, such as sensor networks, are a specific type of network having spatially distributed autonomous devices, such as sensors, actuators, etc., that cooperatively monitor physical or environmental conditions at different locations, such as, for example, energy/power consumption, resource consumption (for example, water/gas/etc. for advanced metering infrastructure or "AMI" applications), temperature, pressure, vibration, sound, radiation, motion, pollutants, etc. Other types of smart objects include actuators, for example, responsible for turning on/off an engine or performing any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port (such as PLC), a microcontroller, and an energy source (such as a battery). Often, smart object networks are considered field area networks (FANs), neighborhood area networks (NANs), etc. Generally, size and cost constraints on smart object nodes (for example, sensors) result in corresponding constraints on resources, such as energy, memory, computational speed, and bandwidth.

Mesh networks have become increasingly popular and practical in recent years. In particular, shared-media mesh networks, such as wireless or PLC networks, etc., are often on what is referred to as Low Power and Lossy Networks (LLNs). LLNs are a class of network in which both the routers and their interconnects are constrained: LLN routers typically operate with constraints (for example, processing power, memory, and/or energy (battery)), and their interconnects are characterized by, illustratively, high loss rates, low data rates, and/or instability. LLNs are comprised of anything from a few dozen or up to thousands or even millions of LLN routers. Additionally, LLN's support point-to-point traffic (between devices inside the LLN), point-to-multipoint traffic (from a central control point, such as the root node, to a subset of devices inside the LLN), and multipoint-to-point traffic (from devices inside the LLN towards a central control point).

Loosely, the term "Internet of Things" or "IoT" may be used by those in the network field to refer to uniquely identifiable objects (things) and their virtual representations in a network-based architecture. In particular, the next frontier in the evolution of the Internet is the ability to connect more than just computers and communications devices, but also the ability to connect "objects" in general, such as lights, appliances, vehicles, HVAC (heating, ventilating, and air-conditioning), windows, window shades, and blinds, doors, locks, etc. The "Internet of Things" thus generally refers to the interconnection of objects (for example, smart objects), such as sensors and actuators, over a computer network (for example, internet protocol ("IP")), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, building and industrial automation, and cars (for example, that can interconnect millions of objects for sensing things like power quality, tire pressure, and temperature, and that can actuate engines and lights), it has been of the utmost importance to extend the IP protocol suite for these networks.

FIG. 1 is a schematic block diagram of an example computer network 100 illustratively comprising nodes/devices 200 (for example, labeled as shown, "root," "11," "12," . . . "45," and described in FIG. 2 below) interconnected by various methods of communication. For instance, the links 105 may be wired links or shared media (for example, wireless links, PLC links, etc.) where certain nodes 200 (such as, for example, routers, sensors, computers, etc.) may be in communication with other nodes 200, for example, based on distance, signal strength, current operational status, location, etc. Those skilled in the art will understand that any number of nodes, devices, links, etc. may be used in the computer network 100 and that the view illustrated herein is for simplicity. Also, those skilled in the art will further understand that while the network 100 is shown in a certain orientation, particularly with a "root" node, the network 100 is merely an example illustration that is not meant to limit the disclosure. In addition, a network management server (NMS) 130, or other head-end application device located beyond the root device (for example, via a WAN), may also be in communication with the network 100.

Data packets 140 (for example, traffic and/or messages sent between the devices/nodes) may be exchanged among the nodes/devices of the computer network 100 using predefined network communication protocols, such as certain known wired protocols, wireless protocols (for example, IEEE Std. 15.15.4, WiFi, Bluetooth®, etc.), PLC protocols, or other shared-media protocols where appropriate. In this context, a protocol comprises of a set of rules defining how the nodes interact with each other.

Figure 2:
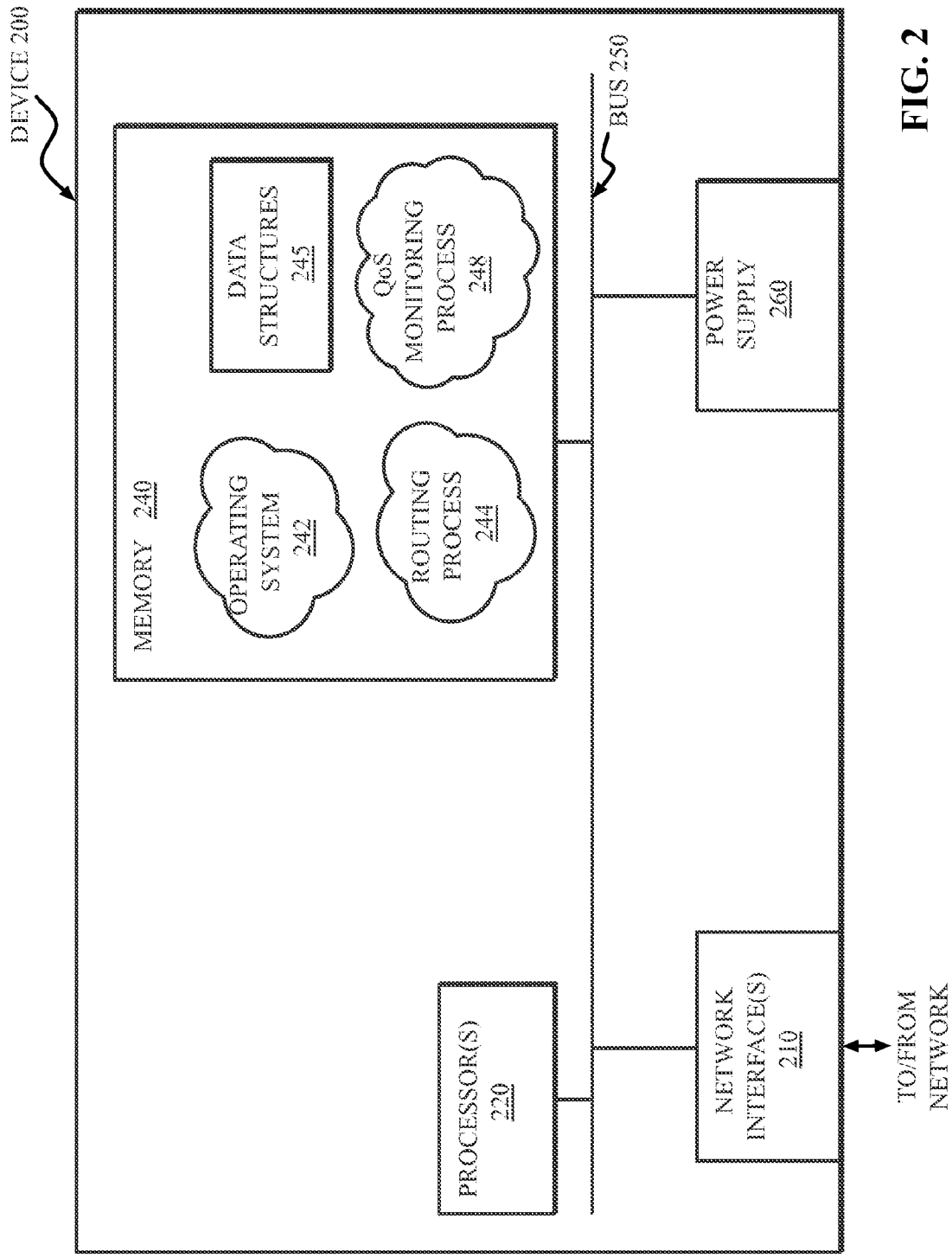
FIG. 2 is a block diagram depicting an example network device/node, in accordance with certain example embodiments.

FIG. 2 is a schematic block diagram of an example node/device 200 that may be used with one or more embodiments described herein, for example, as any of the nodes shown in FIG. 1 above. The device 200 may comprise one or more network interfaces 210 (for example, wired, wireless, PLC, etc.), at least one processor 220, and a memory 240 interconnected by a system bus 250, as well as a power supply 260 (for example, battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes 200 may have multiple types of network connections, for example, wireless and wired/physical connections, and that the view depicted herein is merely for illustration. Also, while the network interface 210 is shown separately from the power supply 260, the network interface 210 may communicate through the power supply 260 or may be an integral component of the power supply, for example, for PLC. In some specific configurations, the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (for example, no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor 220, functionally organizes the device by, inter alia, invoking operations in support of software processes and/or services executing on the device. These software processes and/or services may comprise routing process/services 244 and an illustrative "QoS monitoring" process 248, as described herein. Note that while QoS monitoring process 248 is shown in centralized memory 240, alternative embodiments provide for the process to be specifically operated within the network interfaces 210, such as a component of a network layer operation within the network interfaces 210 (as process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (for example, according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols, as will be understood by those skilled in the art. These functions may, on capable devices, be configured to manage a routing/forwarding table (a data structure 245) containing, for example, data used to make routing/forwarding decisions. In particular, in proactive routing, connectivity is discovered and known prior to computing routes to any destination in the network, for example, using link state routing such as Open Shortest Path First (OSPF), Intermediate-System-to-Intermediate-System (ISIS), or Optimized Link State Routing (OLSR). Reactive routing, on the other hand, discovers neighbors (in other words, it does not have an a priori knowledge of network topology) and, in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), for example, certain sensor networks, may be used in a myriad of applications, such as for "Smart Grid" and "Smart Cities." A number of challenges in LLNs have been presented, such as:
1) Links are generally lossy, such that a Packet Delivery Rate/Ratio (PDR) can dramatically vary due to various sources of interferences, for example, considerably affecting bit error rate (BER);
2) Links are generally low bandwidth, such that control plane traffic must generally be bounded and negligible compared to the low rate data traffic;
3) A number of use cases require specifying a set of link and node metrics, some of them being dynamic, thus requiring specific smoothing functions to avoid routing instability, which considerably drains bandwidth and energy;
4) Constraint-routing may be required by some applications, for example, to establish routing paths that will avoid non-encrypted links, nodes running low on energy, etc.;
5) Scale of the networks may become very large, for example, on the order of several thousands to millions of nodes; and
6) Nodes may be constrained with low memory, a reduced processing capability, a low power supply (for example, battery), etc.

An example implementation of LLNs is an "Internet of Things" network. As described above, the term "Internet of Things" or "IoT" may be used by those in the art to refer to uniquely identifiable objects (things) and their virtual representations in a network-based architecture.

One example protocol is specified in Internet Engineering Task Force (IETF) Proposed Standard, Request for Comment (RFC) 6550, entitled "RPL: IPv6 Routing Protocol for Low Power and Lossy Networks" by Winter, et al. (March 2012). This protocol provides a mechanism that supports multipoint-to-point (MP2P) traffic from devices inside the LLN towards a central control point (for example, LLN Border Routers (LBRs) or "root nodes/devices" generally), as well as point-to-multipoint (P2MP) traffic from the central control point to the devices inside the LLN (and also point-to-point or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (for example, "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, in other words, at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (for example, the farther away a node is from a root, the higher the rank of that node). Further, in certain embodiments, a sibling of a node within a DAG may be defined as any neighboring node that is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (for example, by a DAG process) based on an Objective Function (OF). The role of the objective function is generally to specify rules on how to build the DAG (for example, number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. Alternatively, the constraints and metrics may be separated from the objective function. Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc. are considered "DAG parameters."

Illustratively, example metrics used to select paths (for example, preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (for example, wired, wireless, etc.), etc. The objective function may provide rules defining the load balancing requirements, such as a number of selected parents (for example, single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-19> by Vasseur, et al. (Mar. 1, 2011 version). Further, an example objective function (for example, a default objective function) may be found in an IETF RFC, entitled "RPL Objective Function 0" <RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network and a route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, for example, following the orientation of the edges within the DAG. Conversely, "downward" or "down" paths are routes that lead in the direction from DAG roots towards leaf nodes, for example, generally going in the opposite direction to the upward messages within the DAG.

Generally, a DAG discovery request (for example, DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (for example, DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
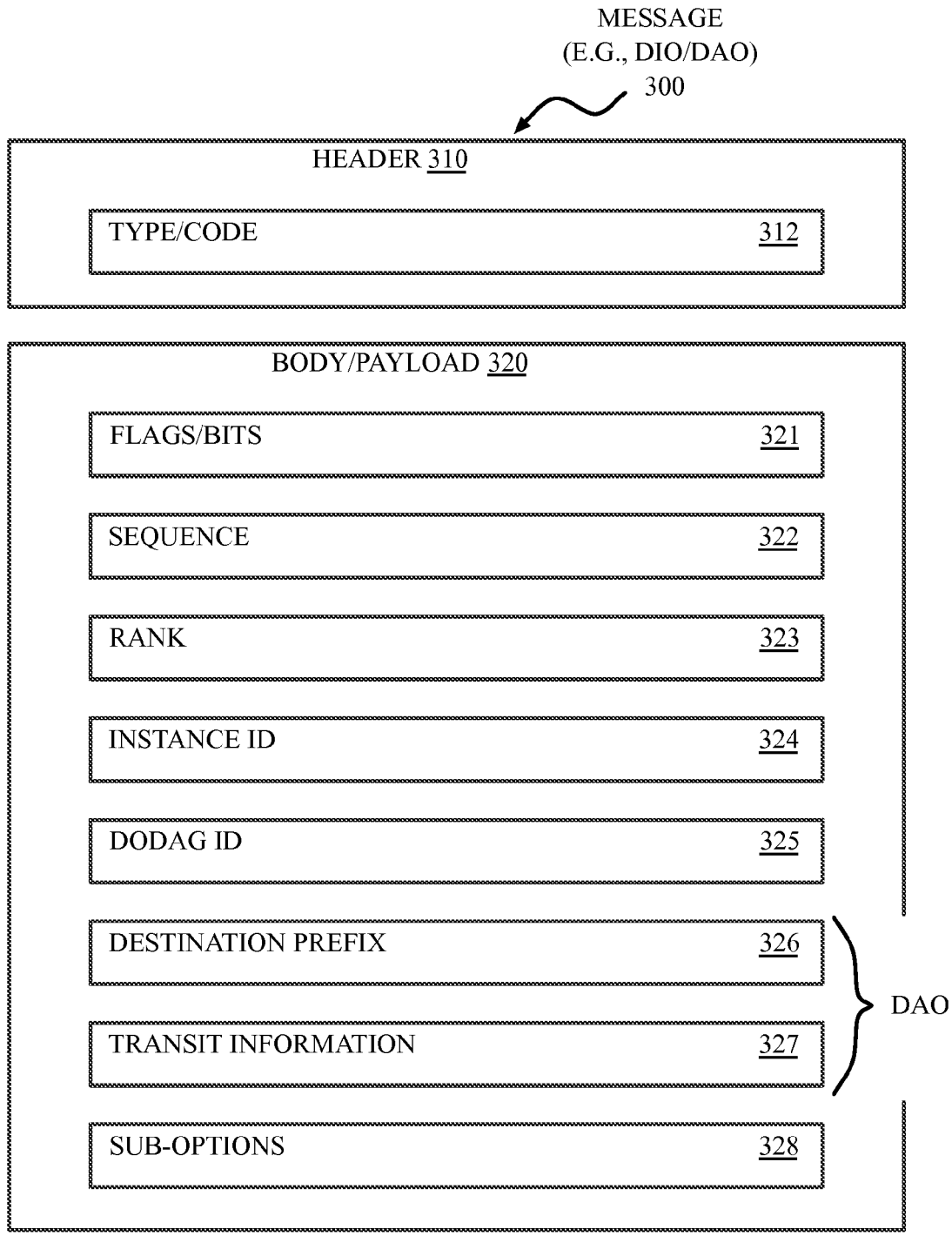
FIG. 3 is a block diagram depicting a packet header and payload organization, in accordance with certain example embodiments.

FIG. 3 illustrates an example simplified control message format 300 that may be used for discovery and route dissemination when building a DAG, for example, as a DIO, DAO, or DIS message. Message 300 illustratively comprises a header 310 with one or more fields 312 that identify the type of message (for example, a RPL control message) and a specific code indicating the specific type of message, for example, a DIO, DAO, or DIS. Within the body/payload 320 of the message may be a plurality of fields used to relay pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (for example, DAO_Sequence used for acknowledgements (ACKs), etc.). For any type of message 300, one or more additional sub-option fields 328 may be used to supply additional or custom information within the message 300. For instance, an objective code point (OCP) sub-option field may be used within a DIO to carry codes specifying a particular objective function to be used for building the associated DAG. Alternatively, sub-option fields 328 may be used to carry other information within a message 300, such as indications, requests, capabilities, lists, notifications, etc., for example, in one or more type-length-value (TLV) fields.

Figure 4:
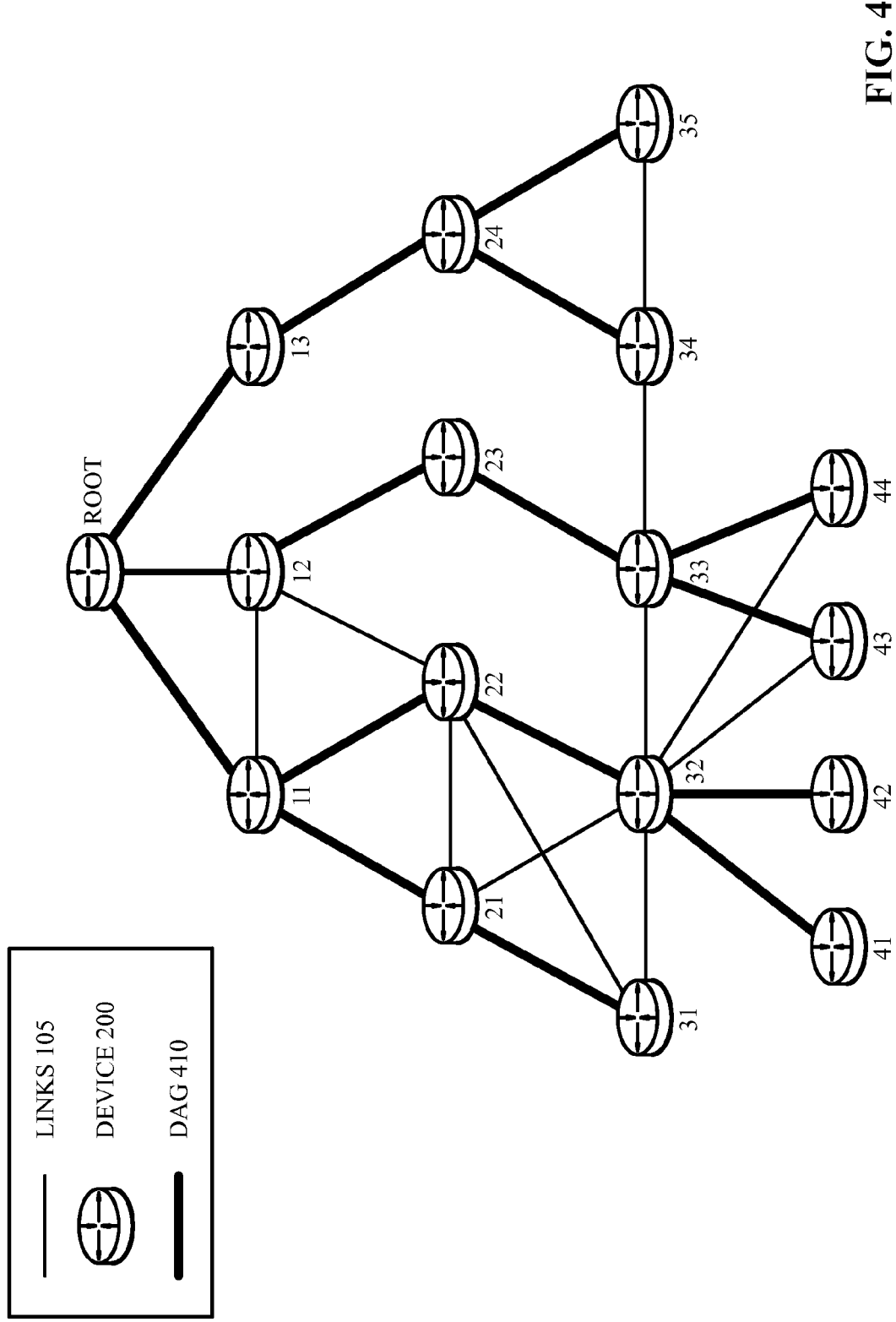
FIG. 4 is a diagram depicting a directed acyclic graph defined within a computer network, in accordance with certain example embodiments.

FIG. 4 illustrates an example simplified DAG that may be created, for example, through the techniques described above, within the network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein. Note that although certain examples described herein relate to DAGs, the embodiments of the disclosure are not so limited and may be based on any suitable routing topology, particularly for constrained networks.

As noted above, shared-media communication networks, such as wireless and power-line communication (PLC)

networks (a type of communication over power-lines), provide an enabling technology for networking communication and can be used for example in Advanced Metering Infrastructure (AMI) networks, and are also useful within homes and buildings. Interestingly, PLC lines share many characteristics with low power radio (wireless) technologies. In particular, though each device in a given PLC network may be connected to the same physical power-line, due to their noisy environment, a PLC link provides limited range and connectivity is highly unpredictable, thus requiring multi-hop routing when the signal is too weak. For instance, the far-reaching physical media exhibits a harsh noisy environment due to electrical distribution transformers, commercial and residential electric appliances, and cross-talk effects. As an example, even within a building, the average number of hops may be between two and three (even larger when having cross phases), while on an AMI network on the same power phase line the number of hops may vary during a day between one and 15-20. Those skilled in the art would thus recognize that due to various reasons, including long power lines, interferences, etc., a PLC connection may traverse multiple hops. In other words, PLC cannot be seen as a "flat wire" equivalent to broadcast media (such as Ethernet), since they are multi-hop networks by essence.

Furthermore, such communication links are usually shared (for example, by using wireless mesh or PLC networks) and provide a very limited capacity (for example, from a few Kbits/s to a few dozen Kbits/s). LLN link technologies typically communicate over a physical medium that is strongly affected by environmental conditions that change over time. For example, LLN link technologies may include temporal changes in interference (for example, other wireless networks or electric appliances), spatial/physical obstruction (for example, doors opening/closing or seasonal changes in foliage density of trees), and/or propagation characteristics of the physical media (for example, changes in temperature, humidity, etc.). The timescale of such temporal changes may range from milliseconds (for example, transmissions from other wireless networks) to months (for example, seasonal changes of outdoor environment). For example, with a PLC link the far-reaching physical media typically exhibits a harsh noisy environment due to a variety of sources including, for example, electrical distribution transformers, commercial and residential electric appliances, and cross-talk effects. Real world testing suggests that PLC link technologies may be subject to high instability. For example, testing suggests that the number of hops required to reach a destination may vary between 1 and 17 hops during the course of a day, with almost no predictability. It has been observed that RF and PLC links are prone to a number of failures, and it is not unusual to see extremely high Bit Error Rates (BER) with packet loss that may be as high as 50-60%, coupled with intermittent connectivity.

As further noted above, many LLNs, particularly AMI networks, demand that many different applications operate over the network. For example, the following list of applications may operate simultaneously over AMI networks:
1) Automated Meter Reading that involves periodically retrieving meter readings from each individual meter to a head-end server;
2) Firmware upgrades, for example, that involve communicating relatively large firmware images (often 500 KB or more) from a head-end server to one device, multiple devices, or all devices in the network;
3) Retrieving load curves;
4) Real-time alarms generated by meters (for example, power outage events) that actually act as sensors;
5) Periodically retrieving network management information from each meter to a Network Management System (NMS) 130;
6) Supporting demand response applications by sending multicast messages from a head-end device to large numbers of meters;
7) Etc.

One of skill in the art will appreciate that the above-enumerated examples are similar for other types of LLNs.

Generally speaking, these different applications have significantly different traffic characteristics, for example, unicast vs. multicast, small units of data vs. large units of data, low-latency vs. latency-tolerant, flows toward a head-end vs. away from the head-end, etc. Furthermore, since these applications must operate simultaneously over a highly constrained LLN network, the network can easily experience congestion, especially when different applications are sending traffic simultaneously. For example, the bandwidth of LLN links may be as low as a few Kbits/s, and even lower when crossing transformers (for PLC). Without proper mechanisms, these situations can cause networks to violate critical service layer agreements (SLAs), for example, delaying the reception of critical alarms from a meter. Accordingly, Quality of Service (QoS) mechanisms are a critical functionality in shared-media communication networks, particularly in highly constrained LLNs.

Numerous QoS mechanisms have been developed for "classic" IP networks (unconstrained), including: (1) packet coloring and classification (for example, by applications or Edge network entry points), (2) congestion avoidance algorithms with random drops for back-pressure on Transmission Control Protocol (TCP) (for example, WRED, etc.), (3) queuing techniques (for example, preemptive queuing+ round robin+dynamic priorities), (4) bandwidth reservation (for example, Diffsery (by CoS), Intsery (RSVP(-TE), etc.), (5) Input/Output shaping (for example, congestion-based traffic shaping), (6) Call Admission Control (CAC) using protocols such as the Resource reSerVation Protocol (RSVP) and/or input traffic shapers, (7) Traffic Engineering, and (8) Congestion Avoidance techniques, etc. However, while some of these techniques may apply to LLNs, most are not suitable because they are too costly in terms of bandwidth (control plane overhead), memory (state maintenance), and/or CPU processing. Indeed, policies must be specified for packet coloring, and queuing techniques and congestion avoidance algorithms, such as WRED, must be configured on nodes. Such algorithms require a deep knowledge of traffic patterns, link layer characteristics, and node resources with respect to a number of parameters to configure each individual device.

Figure 5:
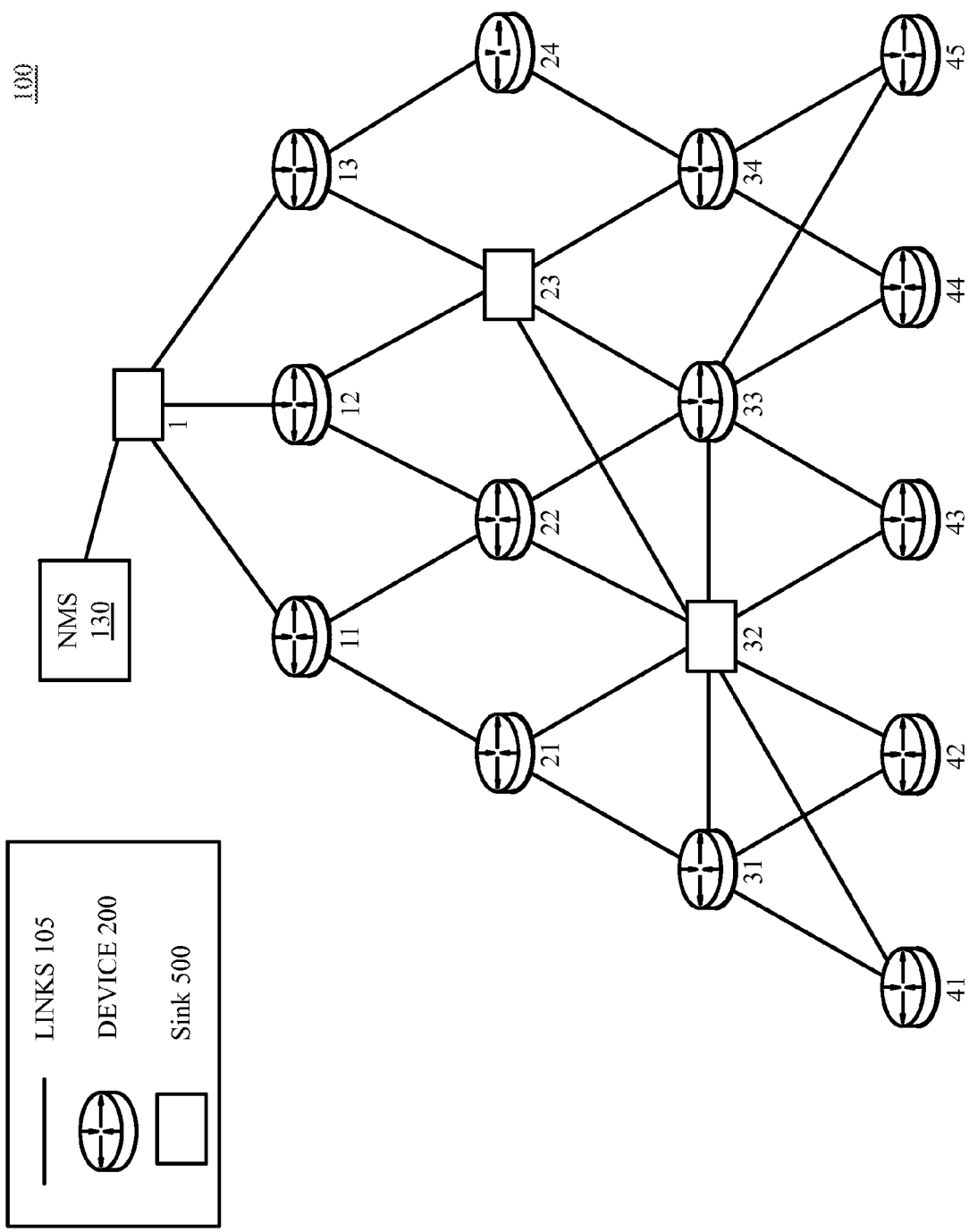
FIG. 5 is a block diagram depicting an example communication network, in accordance with certain alternative example embodiments.

Although the techniques described herein are illustrated with respect to an LLN in which network traffic transits through the root/LBR, it should be noted that the techniques described herein may be generally applied to any network, particularly to any constrained network. For example, as shown in FIG. 5, a network 100 that does not have a central node through which all traffic is piped (for example, like the LBR of an LLN), may have one or more sinks 500 that reside at strategic locations throughout the network (for example, nodes 1, 23, and 32) to ensure that all potential traffic within the network may be monitored and routed according to the techniques described herein. In such an environment, the sinks may operate independently or in collaboration (for example, with each other or with an NMS) to perform the techniques described herein.

The techniques described herein may be performed by hardware, software, and/or firmware, such as in accordance with the "QoS monitoring" process 248/248a shown in FIG. 2, which may contain computer executable instructions executed by the processor 220 (or independent processor of interfaces 210) to perform functions relating to the techniques described herein, for example, in conjunction with routing process 244. For example, the techniques herein may be treated as extensions to conventional protocols, such as the various PLC protocols or wireless communication protocols, and as such, may be processed by similar components understood in the art that execute those protocols.

In-Band Phase Determination in Smart Grid AMI Networks

The disclosed embodiments propose a novel method for determining absolute phase information of Smart Grid advanced metering infrastructure ("AMI") endpoints that communicate using power line communications ("PLC") and other communication technologies. The methods rely on the phase differential mechanism specified in IEEE P1901.2 where a device can determine whether it is on the same phase, +120 degrees, or −120 degrees from a neighboring device. The method provides two embodiments. The first involves reporting the phase differentials to a central device (e.g., Field Area Router ("FAR") or Network Management System ("NMS")). The second involves propagating absolute phase information through the whole network. In both cases, this technology can easily be added within the existing CG-Mesh framework, since this technology piggybacks on existing protocols (for example, IEEE 802.15.4e-2012 and RPL).

Both embodiments may involve at least one root phase device configured with absolute phase information. In many cases, this device may be a FAR that is attached near a transformer where the utility's absolute phase information is likely to be known. However, in general, the root phase device(s) can be any device in the network where absolute phase information is known to be accurate. Note that the root phase device(s) do not need to be connected to all three phases. The embodiment works even if only one root phase device is attached to a feeder region that has multiple phases, as long as cross-talk between phases is possible.

A first embodiment involves reporting the phase differentials to a central device. This embodiment involves including the phase differential to the primary parent in a new routing protocol (e.g., "RPL"). If any device sending a data access object ("DAO") is a root phase device, the device includes the configured absolute phase in another new RPL DAO option. After collecting information from all devices in the network, the FAR can then perform an iterative graph-traversal (such as, breadth-first or depth-first) of the routing graph to propagate the absolute routing information. In the case that devices need to know their absolute phase, the FAR can provide such information in a newly defined message. The advantage of this approach is that the only added communication burden is including relative phase (and possibly absolute phase) information in the RPL DAO messages. However, each device may only learn their absolute phase information from the FAR.

A second embodiment involves propagating the absolute phase differentials throughout the entire network. This approach involves including absolute phase information in a message that devices periodically broadcast/multicast. Because IEEE P1901.2 uses the IEEE 802.15.4e-2012 frame format, a device may include absolute phase information in enhanced beacons using an information element. In this embodiment, a device includes absolute phase information only when it knows its absolute phase. For example, in the initial state, only the root phase device(s) will include absolute phase information in their Enhanced Beacons. In the next step, the neighbors of those absolute phase device(s) then determine their absolute phase based on the phase differential of the neighbor from the absolute phase devices. Once the neighbor devices determine the absolute phase, the neighbor devices include the absolute phase information in their Enhanced Beacons. The process continues until absolute phase information is propagated throughout the entire network. The absolute phase information may be collected at a central location, such as an FAR or NMS, so that the information can be presented to the customer or network manager. The advantage of this approach is that all devices will eventually determine their absolute phase.

In some examples, the PLC end-points may be separated by grid components that add a phase shift to the AC signal. For example, the phase shift through a transformer may involve a +/−180 degree phase shift between the primary and secondary. Depending on wiring, an additional +/−30 degree phase shift may also occur. As a result, when computing absolute phase, these phase offsets can be accounted for. In other words, multiple phase differentials may map to the same phase. Furthermore, a range of phases can be considered to account for jitter and other minor phase offsets that occur within the grid. Since the phase offsets do not result in any overlapping phase offsets, the phase offsets do not cause any ambiguity in determining absolute phase.

Another example component involves supporting polyphase meters. For example, certain utilities plan to deploy two-phase meters that incorporate CG-Mesh. To determine which two phases to which the meter is attached, the meters can be augmented with zero-crossing detection for both phases. In an example where the meter is connected to two phases X and Y, the meter may report the phase differential between X and the corresponding RPL parent and the phase differential between Y and X. In another example embodiment, the device may report the phase differential between X and the corresponding RPL parent, and Y and the corresponding RPL parent. In another embodiment, the device may report the absolute phase for X and the phase differential between Y and X. In yet another embodiment, the device may report the absolute phase for X and Y.

Figure 6:
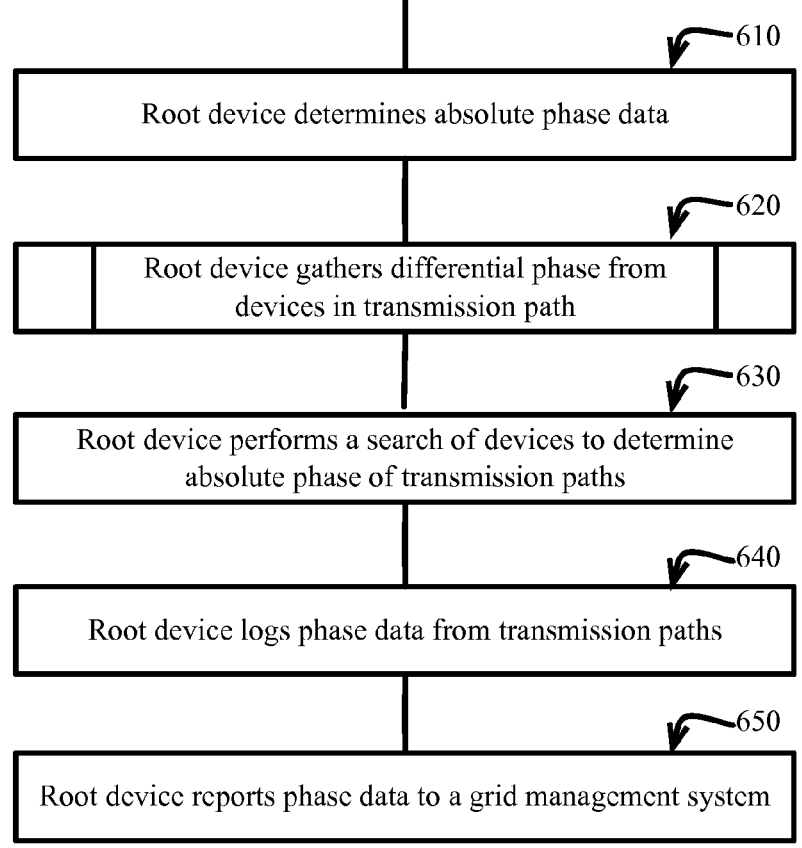
FIG. 6 is a block flow diagram depicting a method to determine absolute phase data from differential phase data of devices, in accordance with certain example embodiments.

FIG. 6 is a block flow diagram depicting a method 600 to determine absolute phase data from differential phase data of devices 200, in accordance with certain example embodiments. The method 600 is described with reference to the components illustrated in FIGS. 1-5.

In block 610, a root device 200a determines absolute phase data. The root device 200a may be configured with the absolute phase data by a network manager or other operator. The root device 200a may gather the absolute phase data from an analysis of an associated transformer or other software or hardware. The root device 200a may receive the absolute phase data from any other suitable source. The root device 200a may be a FAR, NMS, or other central device.

In block 620, the root device 200a gathers differential phase data from devices 200b in the transmission paths. The details of block 620 are discussed in greater detail in the method 620 of FIG. 7.

Figure 7:
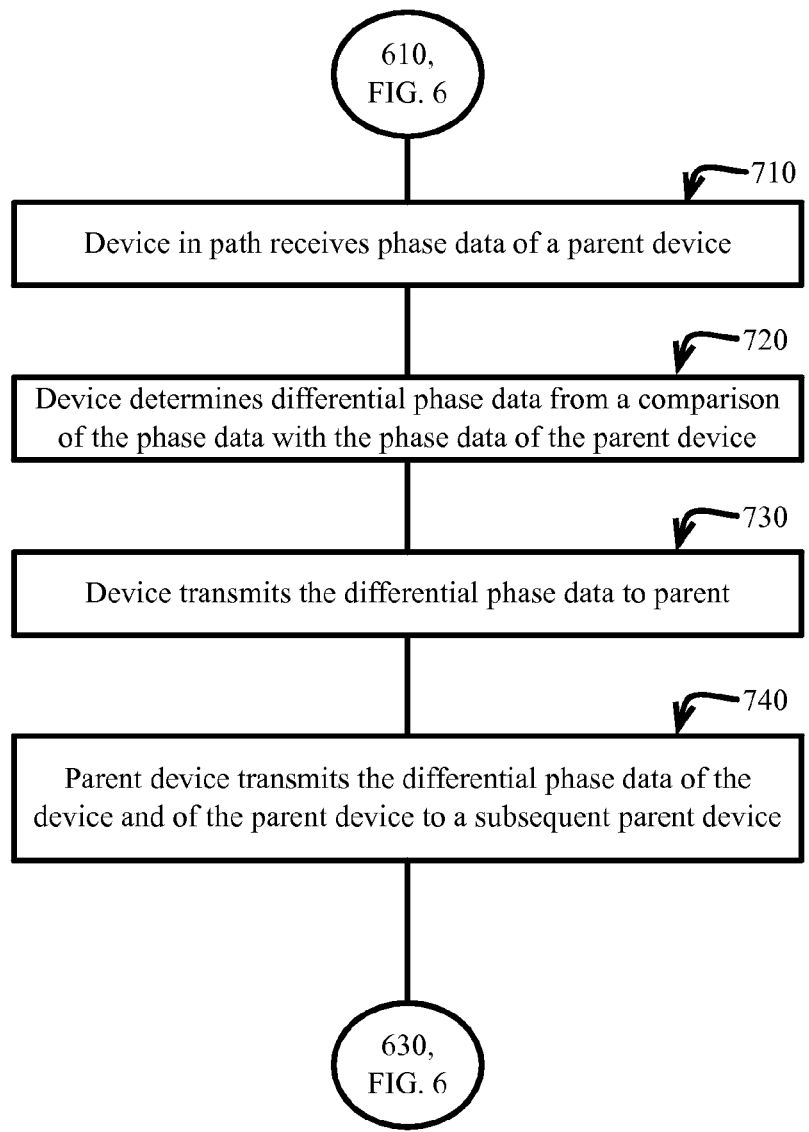
FIG. 7 is a block flow diagram depicting a method to determine the differential phase data of a device, in accordance with certain example embodiments.

FIG. 7 is a block flow diagram depicting a method 620 to determine the differential phase data of a device 200, in accordance with certain example embodiments. The method 620 is described with reference to the components illustrated in FIGS. 1-5.

The IEEE P1901.2 specification provides the mechanisms for two devices 200b, 200c in direct communication range to determine their relative phase difference. The mechanism involves utilizing a zero-cross detector and maintaining a count from the voltage zero crossing. When transmitting a message, the IEEE P1901.2 header from a device 200b includes the current count from the last zero-cross event. A receiving device 200c can then compare the parent device 200b count to its own count and determine whether it is on the same phase, +120 degrees, or −120 degrees.

In block 710, a device 200c in a transmission path receives phase data of a parent device 200b. The phase data may comprise the current count from the last zero-cross event. In another embodiment, the zero-cross event may be associated with a time stamp or other marker. Any suitable manner of identifying the zero-cross event may be employed. The phase data may be transmitted as a separate data object with a data packet, in a separate layer, as an information element, or in any suitable manner.

In block 720, the device 200c determines differential phase data from a comparison of the phase data with the phase data of the parent device 200b. For example, the device 200c determines the current count of the device 200c since the last zero-cross event and compares the current count to the current count provided by the parent device 200b. If the device 200c and the parent device 200b have the same count, then the devices 200b, 200c are in phase. If the counts are not the same, then the devices 200b, 200c are not in phase. Based on the difference in the count (or a difference in the time stamp times), then the device 200c determines the differential phase data. For example, the device 200c may determine that the phase of device 200c is 120 degrees out of phase with the parent device 200b. Any degree of phase difference may be calculated by the device 200c based on the information provided by the device 200b.

In block 730, the device 200c transmits the differential phase data to the parent device 200b. The differential phase data may be transmitted as a separate data object with a data packet, in a separate layer, or in any suitable manner. The differential phase data comprises an identification of the device 200c, the associated parent device 200b, and the degrees out of phase between the two devices 200b, 200c.

In block 740, the parent device 200b transmits the differential phase data of the device 200c and of the parent device 200b to a subsequent parent device 200d. That is, each device that is a parent device 200b to another device 200c, transmits all of the differential phase data to a subsequent parent device 200d until the data reaches the root device 200a.

From block 740, the method 620 proceeds to block 630 in FIG. 6.

Returning to FIG. 6, in block 630, the root device 200a performs a search of the devices 200 to determine the absolute phase of the transmission paths. The root device 200a may perform an iterative graph-traversal of the routing graph to propagate the absolute routing information. For example, the root device 200a identifies one or more transmission paths that are used to transmit information. Then, for each path, the root device 200a identifies the differential phase data from each of the devices 200 in the path. Based on the absolute phase data known by the root device 200a, the root device 200a calculates the absolute phase data of each device 200 in the path. In an example, if the absolute phase data at the root device 200a is known to be 0 degrees, and the first device 200b in the path has a differential phase of −120, then the absolute phase of the first device 200b is −120. If the second device 200c has a differential phase of +120 between the two devices 200b, 200c, then the absolute phase of the second device 200c is 0 degrees.

In block 640, the root device 200a logs the phase data from the devices 200 in the transmission paths. The root device 200a may receive differential phase data from the devices 200 with every transmission received. That is, the device 200c calculates a differential phase with the parent device 200b every time a transmission is sent or received. In an alternate embodiment, the device 200c may calculate and transmit the differential phase data on a configured schedule, such as every third transmission, every minute, every hour, or when requested by the root device or other source. In an alternate embodiment, the device 200c may calculate the differential phase data on any schedule, but only transmit the differential phase data when the data changes. For example, if the differential phase of the device 200c has been −120 for the last 100 calculations, but changes to 0 on the next calculation, then the device 200c transmits the new differential phase data with the next transmission.

In block 650, the root device 200a reports absolute phase data to a grid management system. The grid management system may be represented by a utility operator, a network administrator, a network management system, or any person or device that logs the grid and adjusts the distribution of power. The root device 200a may transmit the absolute phase data of each and every device 200 in the network for which the root device 200a has data. The root device 200a may transmit an overview of the phase data, such as an average or summary. Any data relating to the absolute phase data of the devices 200 may be transmitted by the root device 200a. In an alternate embodiment, the root device 200a may analyze the phase data and make decisions, recommendations, or revisions relating to the power distribution system. The phase information can allow the grid management system, or the root device 200a to apply proper electrical load balancing to their distribution network. For example, the grid management system, or the root device 200a, may adjust the power being supplied to different devices or networks to allow the available power to be utilized more efficiently. The grid management system, or the root device 200a, may recognize changes to the network power and make adjustments or call for repair before a system failure occurs.

Figure 8:
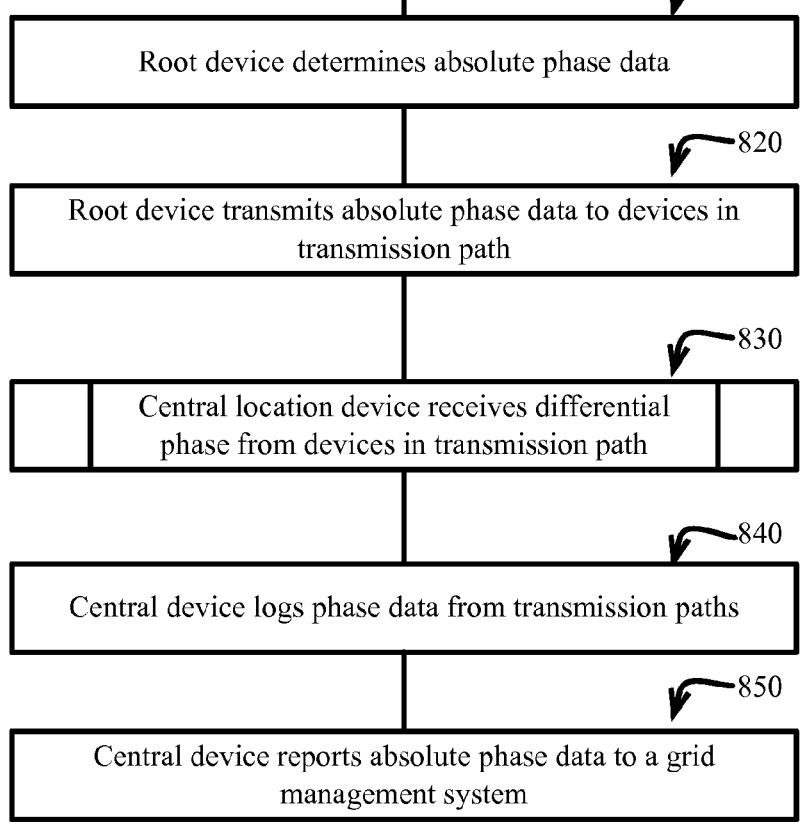
FIG. 8 is a block flow diagram depicting a method to determine absolute phase data from by distributing absolute phase data to network devices, in accordance with certain example embodiments.

FIG. 8 is a block flow diagram depicting a method 800 to determine absolute phase data by distributing absolute phase data to network devices, in accordance with certain example embodiments. The method 800 is described with reference to the components illustrated in FIGS. 1-5.

In block 810, a root device 200a determines absolute phase data. The root device 200a may be configured with the absolute phase data by a network manager or other operator. The root device 200a may gather the absolute phase data from an analysis of an associated transformer or other software or hardware. The root device 200a may receive the absolute phase data from any other source. The root device 220a may be a FAR, NMS, or other central device.

In block 820, the root device 200a transmits absolute phase data to devices 200 in a transmission path. The absolute phase data may be transmitted as a separate data object with a data packet, in a separate layer, as an information element, or in any suitable manner. The absolute phase data may be transmitted directly to any device 200 in the network or by a retransmission from a parent device 200b.

In block 830, a central location device receives differential phase from devices 200 in transmission path. The details of block 830 are discussed in greater detail in the method 830 of FIG. 9.

Figure 9:
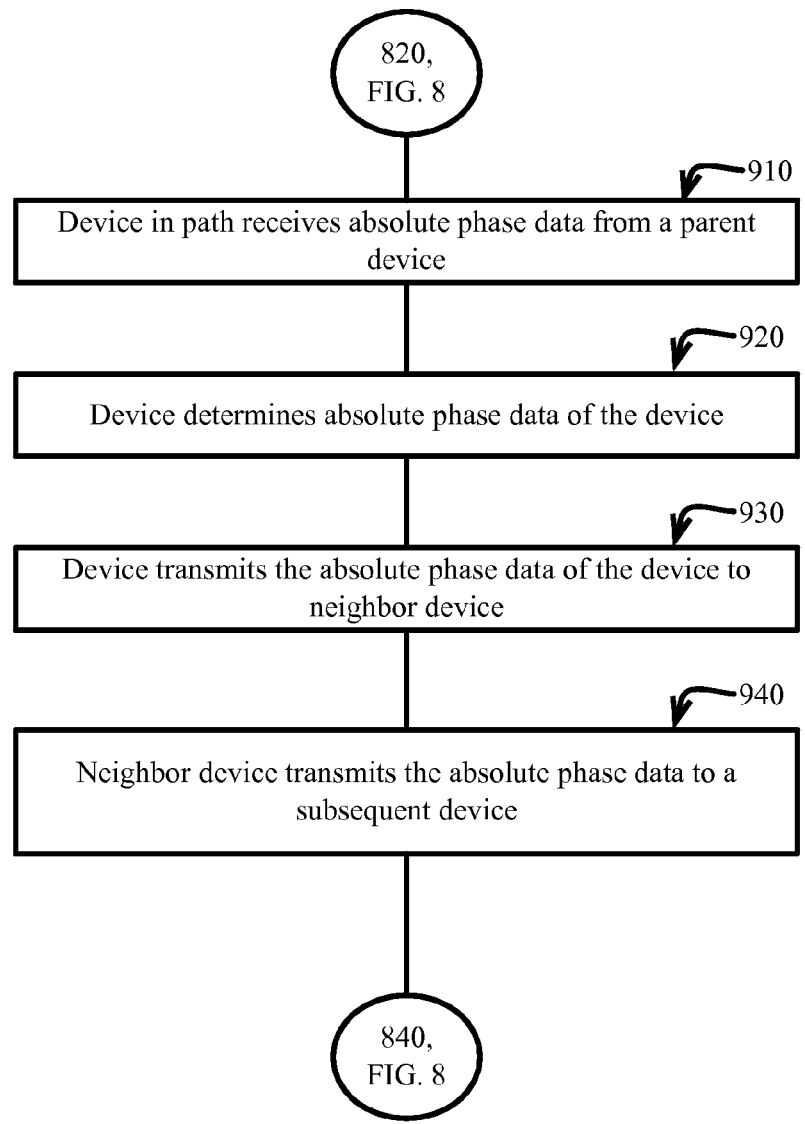
FIG. 9 is a block flow diagram depicting a method to determine the absolute phase data of a device, in accordance with certain example embodiments.

FIG. 9 is a block flow diagram depicting a method 830 to determine the absolute phase data of a device 200, in accordance with certain example embodiments. The method 830 is described with reference to the components illustrated in FIGS. 1-5.

In block 910, a device 200c in the transmission path receives absolute phase data from a parent device 200b. The absolute phase data may be a retransmission of the absolute phase data supplied by the root device 200a. The absolute phase data may be transmitted as a separate data object with a data packet, in a separate layer, as an information element, or in any suitable manner.

In block 920, the device 200c determines the absolute phase data of the device 200c. The absolute phase data of the device 200c may be determined by a comparison of the phase data with the absolute phase data provided by the parent device 200b. For example, the device 200 determines the current count of the device 200c since the last zero-cross event and compares the current count to the absolute phase data. If the device 200c and the absolute phase data match, then the device 200c has an absolute phase that is the same as the absolute phase of the root device 200a. If the phases are not the same, then the device 200c determines the difference between the absolute phase data and the phase data of the device 200c. For example, the device 200c may determine that the phase of device 200c is 180 degrees out of phase with the absolute phase. Based on the difference, the device 200c determines the absolute phase of the device 200c.

In block 930, the device 200c transmits the absolute phase data to the any neighboring device 200n. The absolute phase data may be transmitted as a separate data object with a data packet, in a separate layer, or in any suitable manner. The absolute phase data comprises some or all of an identification of the device 200c, the identification of the associated root device 200a, the absolute phase data of the root device 200a, and the absolute phase data of the device 200c.

In block 940, the neighbor device 200n transmits the absolute phase data to a subsequent device 200. The neighbor device 200 may determine the absolute phase data of the neighbor device 200n. The neighbor device may be the parent device 200b, the root device 200a, or any device 200 that receives transmissions from the device 200c. The neighbor device 200n transmits the absolute phase data provided by the root device 200a, the absolute phase data of the device 200c, and optionally the absolute phase data of the neighbor device 200n.

From block 940, the method 830 returns to block 840 of FIG. 8.

In block 840, a central device logs the phase data from the transmission paths. The central device may be the root device 200a, another FAR or NMS, or any device or system capable of receiving the absolute phase data of the devices 200. The central device receives the absolute phase data from any device 200 that has received the absolute phase data of the root device 200a and determined the absolute phase data of the device 200.

In block 850, the central device reports absolute phase data to a grid management system. The grid management system may be represented by a utility operator, a network administrator, or any person or device that logs the grid and adjusts the distribution of power. The central device may transmit the absolute phase data of each and every device 200 in the network for which the central device has data. The central device may transmit an overview of the phase data, such as an average or summary. Any data relating to the absolute phase data of the devices 200 may be transmitted by the central device. In an alternate embodiment, the central device may analyze the phase data and make decisions, recommendations, or revisions relating to the power distribution system. The phase information can allow the grid management system, or the root device 200a to apply proper electrical load balancing to their distribution network. For example, the grid management system, or the root device 200a, may adjust the power being supplied to different devices or networks to allow the available power to be utilized more efficiently. The grid management system, or the root device 200a, may recognize changes to the network power and make adjustments or call for repair before a system failure occurs.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, an ordinarily skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be repeated, performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structure.

What is claimed is:

1. A method, comprising:
in a low power and lossy network (LLN) comprising one or more interfaces and a plurality of nodes, determining, by a first node, data comprising an absolute phase value of a power on a power line associated with the first node;
transmitting to a second node and a third node, by the first node, data indicating a time corresponding to a last zero crossing of the power supplied to the first node;
receiving, by the second node, data from the first node comprising data indicating the time corresponding to the last zero crossing of the power supplied to the first node;
determining, by the second node, a time since a last zero crossing of the power supplied to the second node;
calculating, by the second node, a differential phase value between the first node and the second node based on the difference between the last zero crossings of the power supplied to the first node and the power supplied to the second node;
transmitting, by the second node to the first node, the calculated differential phase value between the first node and the second node;
receiving, by the first node from the second node, the calculated differential phase value between the first node and the second node;
receiving, by the first node, a calculated differential phase value between the second node and the third node; and
determining, by the first node, an absolute phase value of the second node and an absolute phase value of the third node relative to the phase value of the first node based on the received differential phase values of the second node and the third node and the absolute phase value of the first node.

2. The method of claim 1, further comprising:
receiving, by the third node, data from the second node comprising data indicating the time corresponding to a last zero crossing of the power supplied to the second node;
determining, by the third node, a time since a last zero crossing of the power supplied to the third node;
calculating, by the third node, the differential phase value between the second node and the third node based on the difference between the last zero crossings of the power supplied to the second node and the power supplied to the third node; and
transmitting, by the second node, the calculated differential phase value between the third node and the second node.

3. The method of claim 1, further comprising transmitting, by the first node, the absolute phase value of the second node and the third node to a power grid manager.

4. The method of claim 1, wherein the nodes communicate via a powerline communication technology.

5. The method of claim 1, further comprising determining, by the first node, that a transmission path comprises the first node, the second node, and the third node.

6. A tangible, non-transitory, computer-readable media having software encoded thereon, the software when executed by a processor operable to:
transmit, in a low power and lossy network (LLN) comprising one or more interfaces and a plurality of nodes, to a plurality of nodes by a first node, data indicating a time corresponding to a last zero crossing of the power supplied to the first node;
receive, from a particular node of the plurality of nodes, data from the first node comprising data indicating the time corresponding to the last zero crossing of the power supplied to the first node;
determine, by the particular node, a time since a last zero crossing of the power supplied to the particular node;
calculate, by the particular node, a differential phase value between the first node and the particular node based on the difference between the last zero crossings of the power supplied to the first node and the power supplied to the particular node;
transmit, by the particular node to the first node, the calculated differential phase value between the first node and the particular node;
receive the calculated differential phase value between the first node and the plurality of nodes;
receive a calculated differential phase value between each of the plurality of nodes; and
determine an absolute phase value of one or more of the plurality of nodes relative to the phase value of the first node based on the received differential phase values of each of the one or more of the plurality of nodes and the absolute phase value of the first node.

7. The tangible, non-transitory, computer-readable media of claim 6, the software when executed by a processor being further operable to:
receive by a subsequent node, data from the particular node comprising data indicating the time corresponding to a last zero crossing of the power supplied to the particular node;
determine, by the subsequent node, a time since a last zero crossing of the power supplied to the subsequent node;
calculate, by the subsequent node, the differential phase value between the particular node and the subsequent node based on the difference between the last zero crossings of the power supplied to the particular node and the power supplied to the subsequent node; and
transmit, by the second node, the calculated differential phase value between the subsequent node and the particular node.

8. The tangible, non-transitory, computer-readable media of claim 6, the software when executed by a processor being further operable to transmit the absolute phase value of the plurality of nodes to a power grid manager.

9. The tangible, non-transitory, computer-readable media of claim 6, wherein the nodes communicate via a powerline communication technology.

10. The tangible, non-transitory, computer-readable media of claim 6, the software when executed by a processor being further operable to determine that a transmission path comprises the first node and one or more of the plurality of nodes.

11. A system, comprising:
a processor adapted to execute one or more processes; and
a memory configured to store a process executable by the processor, the process when executed operable to:
transmit, in a low power and lossy network (LLN) comprising one or more interfaces and a plurality of nodes, to a plurality of nodes by a first node, data indicating a time corresponding to a last zero crossing of the power supplied to the first node;
receive, from a particular node of the plurality of nodes, data from the first node comprising data indicating the time corresponding to the last zero crossing of the power supplied to the first node;

determining, by the particular node, a time since a last zero crossing of the power supplied to the particular node;

calculating, by the particular node, a differential phase value between the first node and the particular node based on the difference between the last zero crossings of the power supplied to the first node and the power supplied to the particular node;

transmitting, by the particular node to the first node, the calculated differential phase value between the first node and the particular node;

receive the calculated differential phase value between the first node and the plurality of nodes;

receive a calculated differential phase value between each of the plurality of nodes; and determine an absolute phase value of one or more of the plurality of nodes relative to the phase value of the first node based on the received differential phase values of each of the one or more of the plurality of nodes and the absolute phase value of the first node.

12. The system of claim 11, the process when executed being further operable to:

receive by a subsequent node, data from the particular node comprising data indicating the time corresponding to a last zero crossing of the power supplied to the particular node;

determine, by the subsequent node, a time since a last zero crossing of the power supplied to the subsequent node;

calculate, by the subsequent node, the differential phase value between the particular node and the subsequent node based on the difference between the last zero crossings of the power supplied to the particular node and the power supplied to the subsequent node; and transmit, by the second node, the calculated differential phase value between the subsequent node and the particular node.

13. The system of claim 11, the process when executed being further operable to transmit the absolute phase value of the plurality of nodes to a power grid manager.

14. The system of claim 11, wherein the nodes communicate via a powerline communication technology.

15. The system of claim 11, the process when executed being further operable to determine that a transmission path comprises the first node and one or more of the plurality of nodes.

* * * * *